Figure 1:
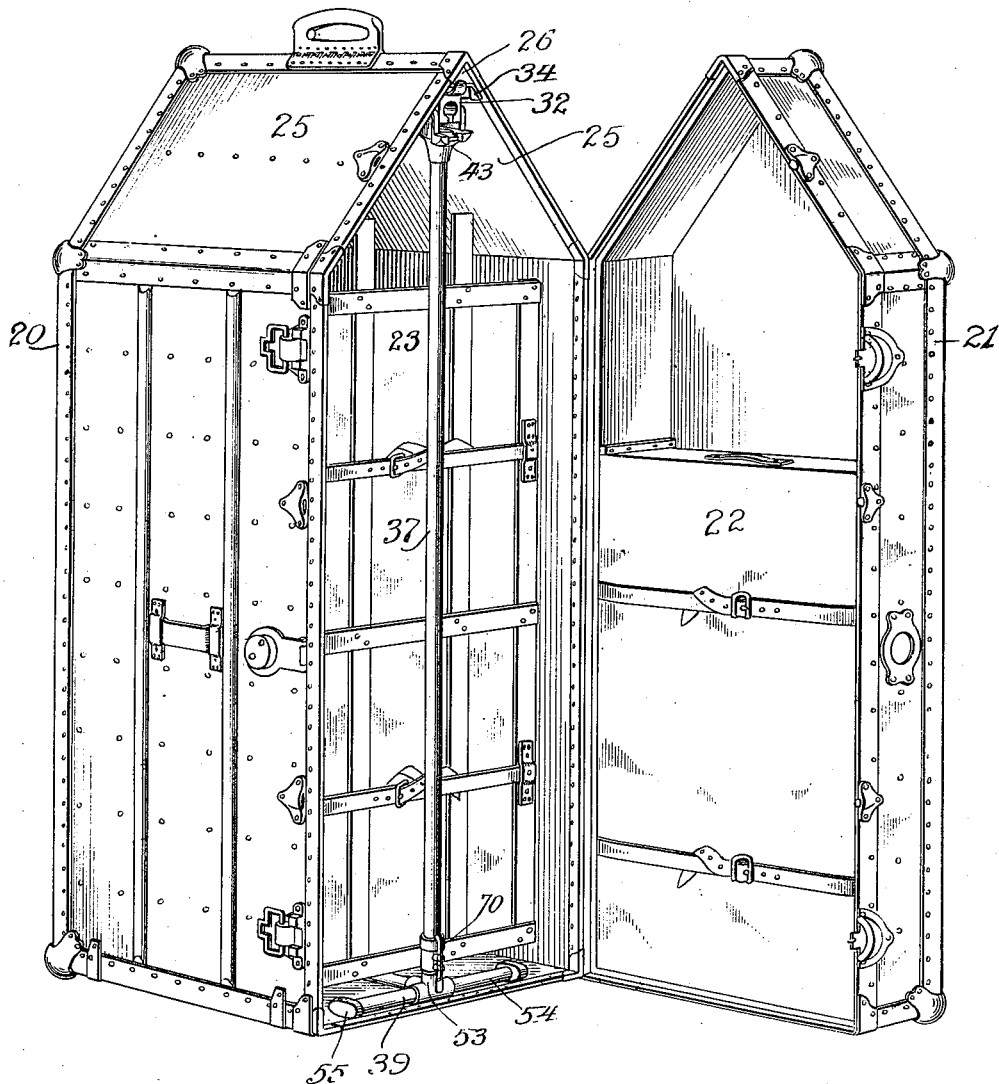

C. T. & E. E. WILT.
SUSPENSION FIXTURE DEVICE FOR TRUNKS AND THE LIKE.
APPLICATION FILED NOV. 24, 1908.
1,000,654.
Patented Aug. 15, 1911.
4 SHEETS—SHEET 2.
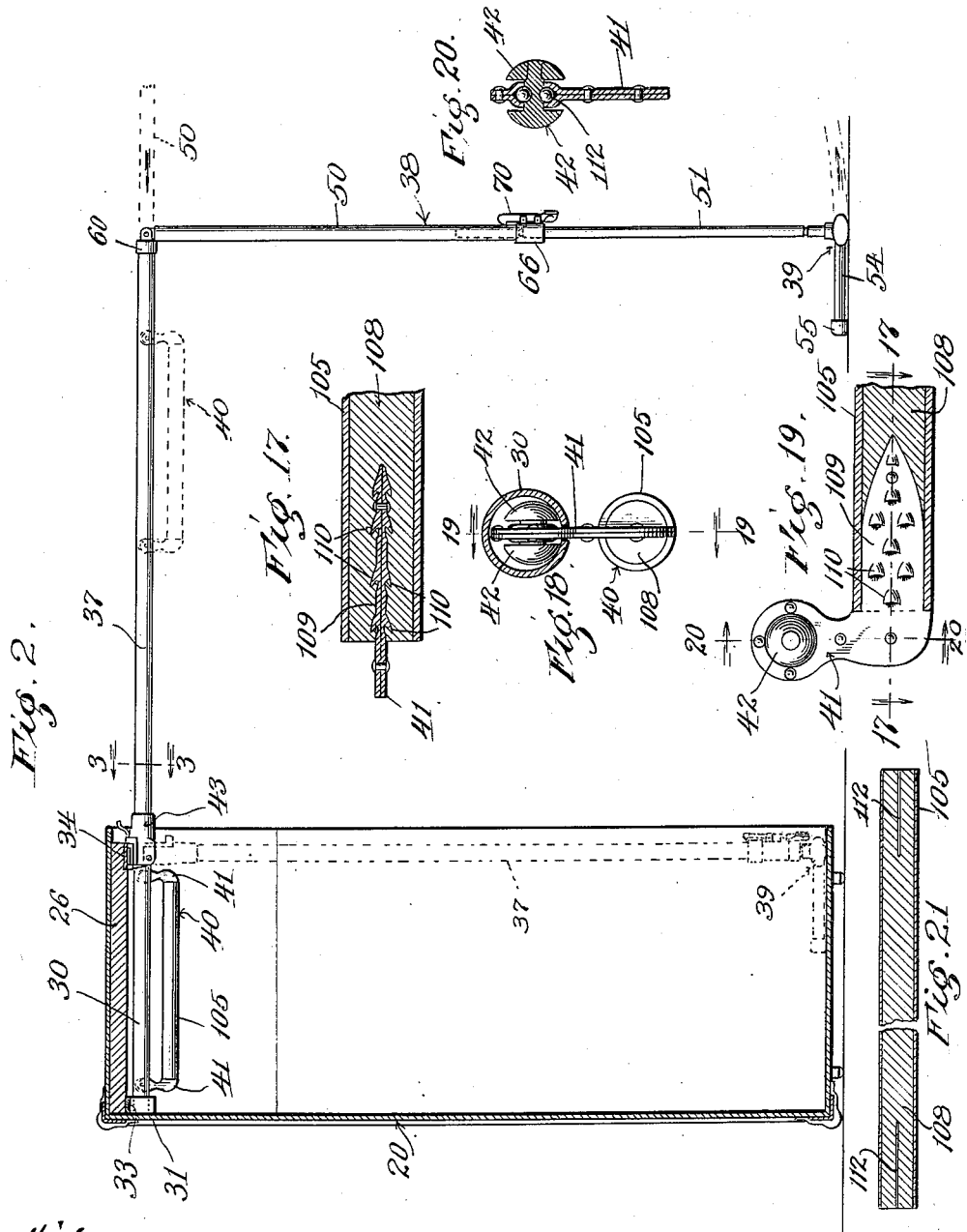

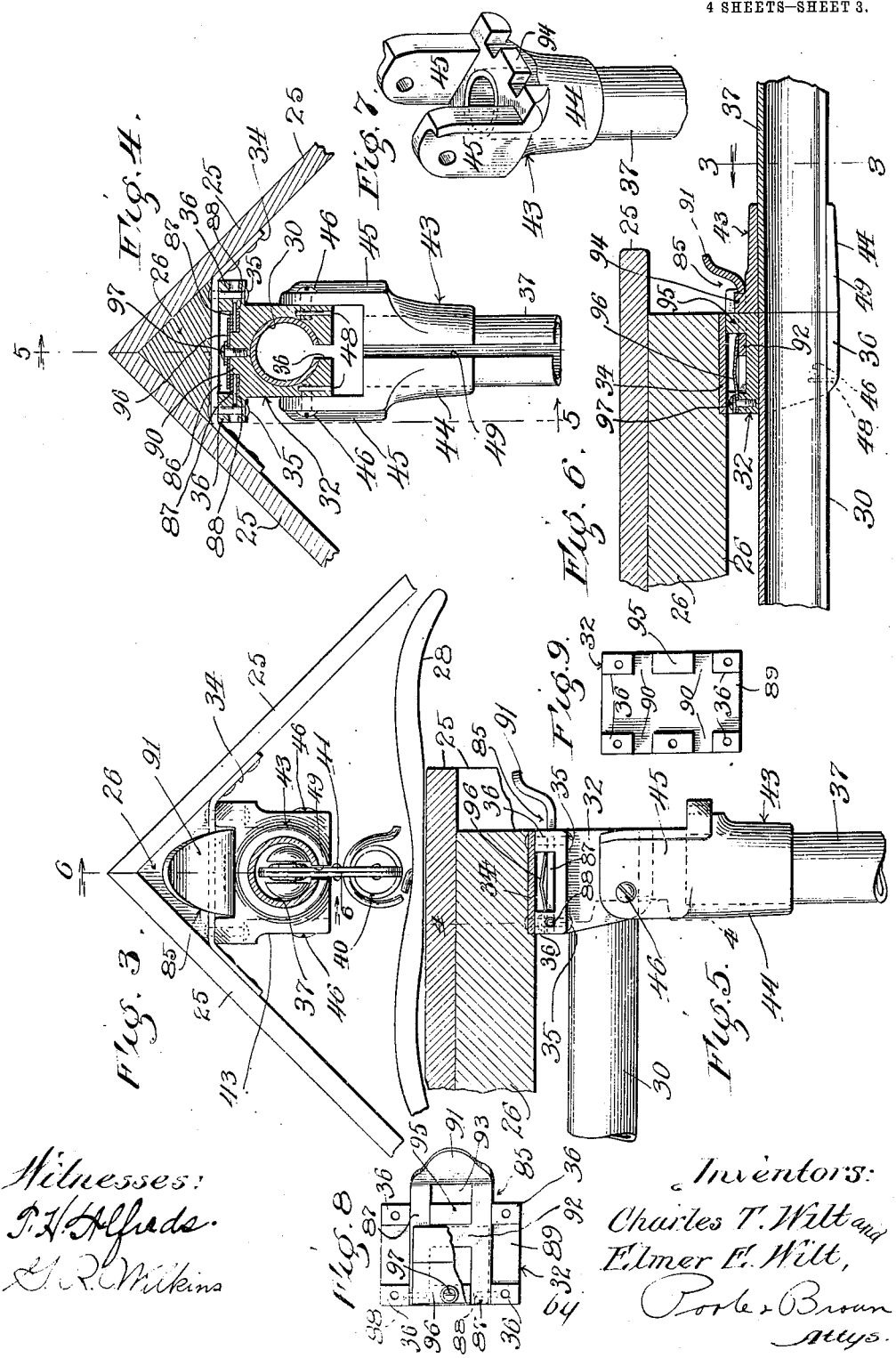

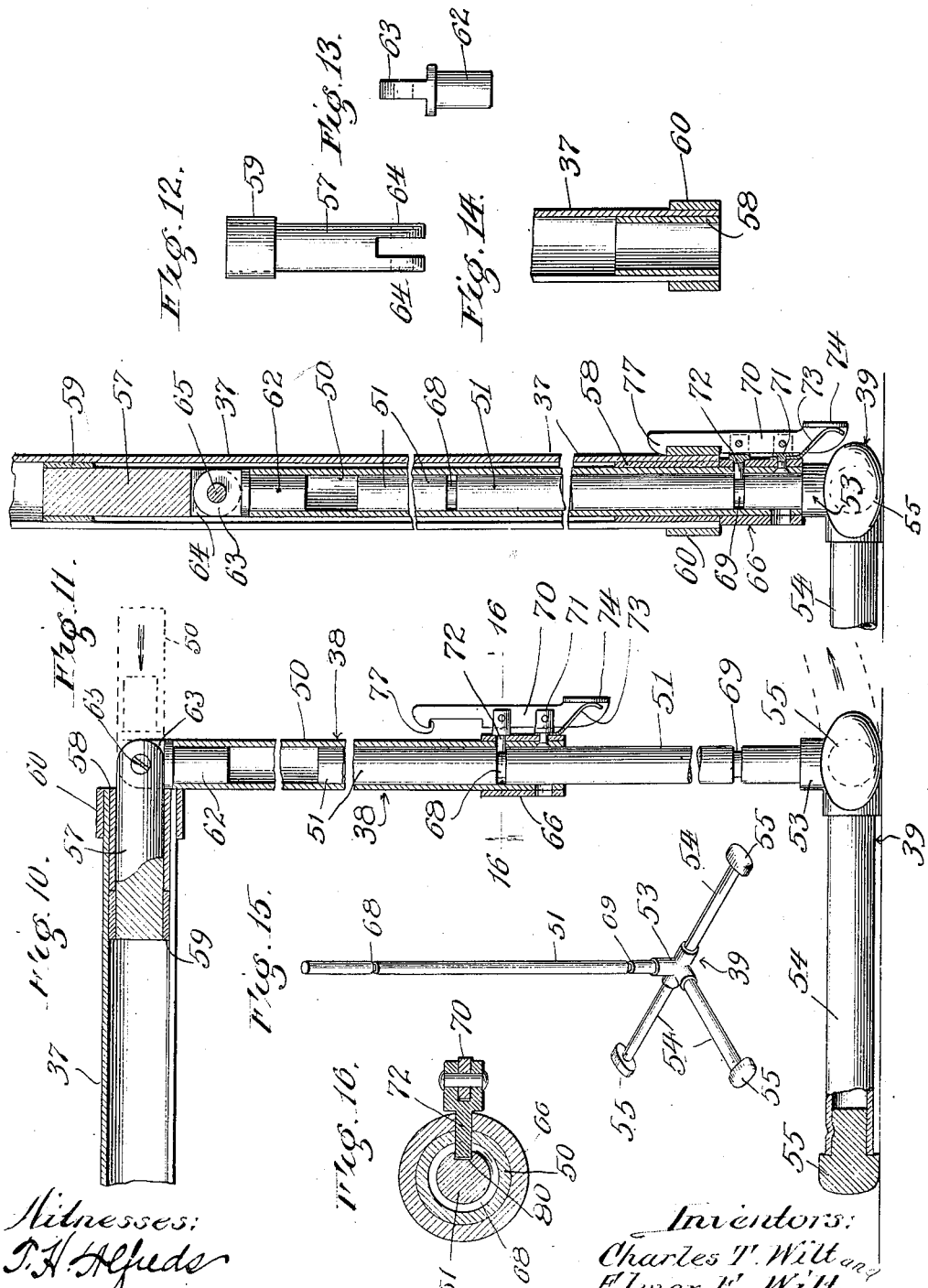

UNITED STATES PATENT OFFICE.

CHARLES T. WILT AND ELMER E. WILT, OF CHICAGO, ILLINOIS, ASSIGNORS TO THEMSELVES, COPARTNERS DOING BUSINESS UNDER THE FIRM-NAME OF CHAS. T. WILT, OF CHICAGO, ILLINOIS.

SUSPENSION FIXTURE DEVICE FOR TRUNKS AND THE LIKE.

1,000,654.             Specification of Letters Patent.      Patented Aug. 15, 1911.

Application filed November 24, 1908. Serial No. 464,338.

*To all whom it may concern:*

Be it known that we, CHARLES T. WILT and ELMER E. WILT, citizens of the United States, and residents of Chicago, in the county of Cook and State of Illinois, have invented certain new and useful Improvements in Suspension Fixture Devices for Trunks and the Like; and we do hereby declare that the following is a full, clear, and exact description thereof, reference being had to the accompanying drawings, and to the letters of reference marked thereon, which form a part of this specification.

This invention relates to wardrobe trunks or other compartments wherein garments are adapted to be contained in a suspended position, and to suspending fixture devices so used with respect to such compartments as to permit the suspending devices, with the garments hanging thereon, to be withdrawn from the compartments and to be properly supported in a withdrawn position.

The invention relates further to certain details of construction adapted to these and similar fixtures, and the invention consists in the matters hereinafter set forth and more particularly pointed out in the appended claims.

The construction herein shown is generally like the construction set forth in our prior U. S. Letters Patent Number 880,058, granted February 25th, 1908, and the present invention seeks to improve and simplify the construction, facilitate its use, and to otherwise improve devices of this same general character.

The fixture device is herein shown as applied to a trunk of that type known as a "wardrobe trunk," but may be applied to other compartments for containing articles of clothing and the like, or to other suspending and supporting devices.

As shown in the drawings:—Figure 1 is a perspective view of a trunk embodying our invention, with the swinging lid or section open. Fig. 2 is a longitudinal section of the trunk showing the suspending devices withdrawn therefrom. Fig. 3 is a fragmentary section taken on line 3—3 of Fig. 2. Fig. 4 is a vertical section taken on line 4—4 of Fig. 5 looking forwardly. Fig. 5 is a fragmentary longitudinal section taken on line 5—5 of Fig. 4. Fig. 6 is a fragmentary vertical section taken on line 6—6 of Fig. 3. Fig. 7 is a perspective view of a fitting constituting a portion of the hinge which connects the extension rail to the fixed rail. Fig. 8 is a plan view partially broken away of a support for the fixed rail and a latch for locking the extension rail to said support. Fig. 9 is a plan view of said support with the latch removed. Fig. 10 is a fragmentary view illustrating the forward end of the extension rail and its supporting standard. Fig. 11 is a longitudinal sectional view illustrating the extension rail and the parts of the standard which are telescoped therein in the position which said parts occupy when contained within the compartment. Fig. 12 is a side elevation of one of the hinge members for connecting the extension rail to its standard. Fig. 13 is a side elevation of the other hinge member associated therewith. Fig. 14 is a fragmentary axial section of the outer end of the extension rail. Fig. 15 is a perspective view illustrating the lower member of the standard removed from the upper member. Fig. 16 is a transverse section taken on line 16—16 of Fig. 10. Fig. 17 is a detail section on line 17—17 of Fig. 19, showing a detail of the hanger carriage. Fig. 18 is an end view of the carriage. Fig. 19 is a section taken on line 19—19 of Fig. 18. Fig. 20 is a section taken on line 20—20 of Fig. 19. Fig. 21 is an axial section, broken away, of the bar constituting part of the carriage.

As shown in the drawings, the trunk in which our invention is embodied embraces two compartments or section 20, 21 which are hinged together to close one on the other in a familiar manner. The section 21 may be fitted with drawers or trays 22 in the usual manner of trunks of this character. The other section or compartment has a larger space to receive articles of apparel or the like suspended from suitable hangers located at and supported in the top of the trunk. The larger compartment 20 may be provided at its open side with a follower 23 of familiar form.

In accordance with one feature of the invention, the upper end of the trunk is of gabled form, the top wall comprising oblique members 25, 25 which meet to form a peak.

26 designates a ridge piece which is attached to said top wall members beneath the ridge thereof, and to said ridge piece the parts of the suspending fixture device contained within the trunk may be secured. The upper end wall of the smaller compartment 21 of the trunk is likewise formed to correspond to and fit upon the members 25. This arrangement of the top wall of the trunk has been devised to prevent the trunk being set on its upper peaked end, in which the suspending devices are mounted and from which the articles of clothing and the like are suspended on hangers 28, as shown in Fig. 3, thus avoiding liability of the clothing falling down and being wadded in the top of the inverted trunk. Moreover, the oblique members of the top wall bear such relation to the hangers as to prevent the hangers slipping off their supporting carriage in case the trunk is inverted. This construction also has the further advantage of saving weight and material in the trunk body and of providing an exceedingly strong and durable top wall construction to resist blows to which the wall may be subjected.

The suspension fixture devices are made as follows: 30 designates a fixed rail arranged horizontally in the top of the trunk beneath the ridge piece 26. The rail is supported at its ends in blocks 31 and 32 fixed to the under side of the ridge piece as by cross straps or bars 33, 34, the latter being arch-shaped with its intermediate part fitting between the forward block and ridge piece, and the ends thereof fit beneath and are attached to the oblique members of the top by rivets or the like. The said forward block 32 is fixed to said arched bar 34 by means of bolts 35 extending through flanges 36 at the sides of the block and through the central part of the bar, as shown in Fig. 4. The fixed rail is shown as made tubular and is slotted at its lower side to receive parts of a carriage suspended thereby, the carriage having rollers or other bearing parts for engagement with tracks formed within the tubular rail. The block 32 is provided with a horizontal opening to receive the tubular rail and at its lower side with a slot in line with the slot of said rail.

37 designates an extension rail, which is hinged or otherwise connected to the forward end of the stationary rail and is adapted to extend horizontally therefrom and be supported in a horizontal position by a suitable standard designated as a whole by 38. The extension rail is also shown as made tubular and as slotted at its lower side in line with the slot of the fixed rail to permit the carriage to be moved from the fixed to the extension rail. This construction is generally similar to the like construction illustrated in our aforesaid patent. The standard 38 is hinged to the extension rail and is arranged to be telescoped thereinto and is provided with a crow foot base 39. The standard 38 is made of members that are adapted to telescope one within the other in a manner hereinafter to be described. The carriage 40 has arms 41 which extend through the slots of the rails and said arms are provided with rollers 42 which travel on tracks on the inner surfaces of the tubular rail and is arranged to be moved outwardly on the extension rail 37, as to the dotted line position indicated in Fig. 1. The construction of the carriage which supports the hangers 28 will be hereinafter described.

Referring now to the devices for hinging the tubular extension rail to the tubular stationary rail, said parts are made as follows: The inner end of the extension rail 37 is provided with a fitting 43 (Figs. 4, 5 and 7) which comprises a tubular part 44 adapted to fit over the inner end of the extension rail and laterally separated hinge lugs 45, 45 which fit in overlapping engagement with the sides of the fixed rail supporting block 32 and are hinged to said block by means of hinge screws 46, 46 extending through said lugs into the sides of the block. In order to lock the screws from turning in said block, locking pins 48, 48 are inserted upwardly through openings in the lower side of the block and are arranged to bear or bind on the sides of the screws at the inner ends thereof so as to prevent said screws from turning. The fitting 43 is provided with a slot 49, in line with the slot of the tubular extension rail and with the slot of the block 32, which affords a continuous slot through which the arms 41 of the carriage may move from the fixed to the extension rail when the latter is in its horizontal position.

Referring now to the construction of the standard 38 and the manner of connecting the same with the outer end of the extension rail, these parts are made as follows: The said standard 38 comprises two telescopic members, to-wit, an upper tubular member 50 and a lower inner member 51, which latter extends upwardly a distance into the lower end of the upper tubular member. The lower member 51 is connected at its lower end with the crow foot base 39 through the medium of a fitting 53, said lower member extending into an upwardly opening tubular branch of said fitting 53. The arms 54 of the base are fitted in the radial tubular members of said fitting. The said arms of the crow foot base are provided at their ends with headed plugs 55 to form a bearing for the arms. The shanks of said plugs enter the outer ends of the arms and the parts may be interlocked together by pressing or crushing the metal of the tubular arms into the shanks in the manner shown in Fig. 10.

The upper member 50 of the standard is hingedly connected with the outer end of the tubular extension rail 37 by means which permit the said standard to telescope into said rail. Such hinged connection is made as follows: Contained within the outer end of the tubular extension rail is a plug 57 which relatively fits within a bushing 58 that in turn fits closely in the end of the extension rail. The plug 57 is provided in rear of the bushing 58 with a tight fitting collar 59 which constitutes an annular shoulder to engage the rear end of the bushing 58 to limit the outward movement of the plug. The outer end of the extension rail 37 is surrounded by a closely fitting collar 60 which constitutes a head or shoulder thereon for a purpose hereinafter to be described. 62 designates a plug that fits tightly within the upper end of the tubular member 50 of the standard and is provided at its outer end with a hinge lug 63 that fits between laterally separated hinge lugs 64, 64 on the end of the stud 57. Said hinge lugs are connected together by a hinge pin 65 extending through openings in the overlapping parts of said lugs. The hinge connections thus described are of such dimensions that when the standard is swung outwardly into alinement with the extension rail 37 the said standard may be telescoped into the extension rail in the manner clearly indicated in Figs. 1 and 11.

The lower member 51 of the standard 38 is arranged to be telescoped into the upper member 50 thereof preparatory to telescoping the standard into the extension rail and arranging the parts to be placed within the compartment or trunk. The lower end of the upper tubular member 50 of the standard is provided with a sleeve or collar 66 constituting an annular shoulder which is adapted for engagement with the outer end of the extension rail when the standard is telescoped thereinto to limit the inward telescopic movement of the said member of the standard into the extension rail. The lower or inner member of the two part standard is held in its telescoped and extended positions, relatively to the upper tubular member, by locking devices arranged as follows: The said lower member, which may be made solid or of tubular construction, is provided at longitudinally separated points with annular grooves 68, 69, the former within the tubular upper member and the latter near the bottom of said lower member. The lower end of the tubular member of the standard carries a lever 70 which is pivoted to a stud 71 fixed to said tubular member and is provided with a pivotally mounted locking pin or bolt 72 which extends through openings in the collar 66 and the lower end of the tubular member 50 for engagement with the upper annular groove 68 of the lower member of the standard. A spring 73 acts on a laterally extending thumb piece 74 of the lever 70 to normally hold the lever in position to project the locking pin or bolt 72 to its innermost position. The said locking pin 72 engages the upper annular groove 68 and locks the two members of the standard extended in position to support the extension rail. The said locking pin or stud likewise engages the lower groove 69 when the lower member of the standard is telescoped within the upper member thereof and locks the members in their telescoped positions, as shown in Fig. 11. The said lever 70 is formed at its upper end with a hook or detent 77 which, when the upper tubular member of the standard is telescoped into the outer end of the extension rail 37, is adapted to engage over the shoulder formed by the collar 60, before referred to, and surrounding the outer end of the rail. Thus the said latch lever 70 is arranged to lock all the parts in their telescoped or collapsed positions.

In Fig. 10 the standard and the outer end of the extension rail are shown in the position which they occupy when the rail is extended to support a carriage thereon, and in this position the locking pin or bolt carried by the latch lever 70 engages with the upper annular locking groove 68 of the lower member of the standard to lock the standard extended. In Fig. 11 the said lower portion of the standard is shown as telescoped into the upper tubular portion, and the latter in turn telescoped into the tubular extension rail. When the parts occupy these positions, the sleeve or collar 66 is engaged with the end of the extension rail to limit the telescoping movement of the tubular member of the standard thereinto, and the lower end of the tubular member of the standard is engaged with the fitting 53 of the crow foot base. In these positions of the parts it will be seen that the extension rail and its standard are contained within a longitudinal space of a length but little greater than that of the extension rail itself, and that said rail may be readily swung downwardly into the forward or open side of the trunk compartment in the position indicated in dotted lines in Fig. 2, and in full lines in Fig. 1. It will also be observed that the single spring pressed lever 70 carries locking devices by which the several telescopic parts are locked in their collapsed positions, this feature being an extremely simple and convenient one.

The grooves 68 and 69, or one of them, may be provided at its bottom with a notch 80 (Fig. 16) which is adapted to be engaged by the inner end of the locking pin or bolt 72 and to thereby avoid tendency of the lower member of the standard rotating relatively to the upper member thereof.

By reason of the fact that the plug 57, constituting one of the members of the hinge by which the standard is hinged to the extension rail, is capable of rotating within the extension rail, it follows that the connection between the standard and extension rail is such as to afford a range of universal movement of the standard about the outer end of the extension rail. This feature of the construction is advantageous inasmuch as lack of space immediately in front of the trunk may sometimes render it inconvenient to swing the standard upwardly or downwardly in the vertical plane of the rail, whereas it may be readily swung downwardly or upwardly at one side of such vertical plane.

An advantage of making the standard of two members telescopic one within the other lies in the fact that the telescoped members of the standard may be swung upwardly or downwardly from a horizontal position with less free space in front of the trunk than in cases where the main body of the standard is of a single or continuous piece. That is to say, when working in close quarters to telescope the standard into the extension rail, the lower member of the standard may first be telescoped into the upper member thereof, and thereafter the shortened or collapsed standard swung upwardly in a relative small space in front of the trunk into alinement with the extension rail in position to be telescoped therein. It will, furthermore, be observed that the locking devices carried by the latch lever 70 operate automatically to effect their locking connections, thus facilitating the operation of collapsing the fixture device.

We have provided means for rigidly locking the extension rail with respect to the fixed rail when said extension rail occupies its horizontal or operative position. Such rigid connection of the rails is useful in trunk constructions having the supporting standards 38, inasmuch as the structure, as a whole, is more stable than if such rigid connection is not present. In the use of the fixture for a stationary compartment or of a short extension rail for a relatively heavy trunk, the lock between the fixed and stationary rails may be sufficient in itself to hold the extension rail in its horizontal position. In either event, the operation of the lock is the same. The lock is made as follows: 85 (Figs. 3 to 9, inclusive) designates a latch that is located above the forward supporting block 32 of the stationary rail. This latch is shown as made of flat metal and is provided with two arms 87, 87 which are hinged at the rear side of the block through the medium of hinge pins 88, 88 that extend horizontally through the flanges 36 of the block 32 and laterally into said arms. The upper face of the block is formed to provide a transverse recess 89 between the flanges 36 and said flanges are transversely cut away to provide notches 90 to receive the arms of said latch. The said latch extends at its outer end beyond the block 32 and is formed to provide an upwardly inclined finger piece 91 by which it may be manipulated. Said latch is provided, between the finger piece and a cross piece 92, integral with the latch arms, with a socket 93 which is adapted to fit over a locking lug 94 of the extension rail when the latter is in its horizontal position. The socket also fits over a central lug 95 formed between the notches 90 of the forward flange 36 of the block 32. The latch is held with its forward end depressed by means of a spring 96 which is attached to the rear flange of the block by a screw 97 and bears at its forward end against the upper side of the cross piece 92 of the latch. The relation of the socketed portion of the latch with respect to the locking lug 94 is such that when the extension rail is swung upwardly the said lug 94 passes beneath the forward end of the latch and raises the same and springs into the socket, whereupon it is automatically locked in rigid connection with the stationary or fixed rail. The cross piece 92 of said latch, bearing as it does against the rear side of the lug 95, relieves the pivot pins 88 of the latch from stress due to the load carried by the extended extension rail, and provides a construction of great strength, and capable of sustaining a heavy load on the extension rail. When the extension rail is to be swung downwardly, the latch is released from the locking lug 94 by engagement of the finger with the finger piece 91 of the latch to raise the latch upwardly.

The hanger carriage 40 herein shown consists, in general terms, of a horizontal bar having at its ends the upwardly directed arms 41, referred to, which extends through the slots of the rails and hinge fittings and carry at their upper ends the bearing rollers 42 before referred to. The said carriage is of special construction, as will appear from an inspection of Figs. 16 to 19, inclusive, and is made as follows: The horizontal bar of the carriage comprises a sheet metal tube 105 and a wood or other fibrous filling or core 108, preferably made coextensive in length with the tube. Into this core are driven the shanks 109 of the carriage suspending arms 41. The shank and arm at each end of the carriage is herein shown as made of two flat pieces of metal which are riveted together, one end constituting the shank and the other end the arm. The shanks are sharpened to be readily driven into the core and the shank members are provided on their side faces with barbed projections 110 of such form as to permit the shank to be readily driven into the core, but which prevent the withdrawal of the shanks from the core, as clearly shown in Figs. 17 and 19. When the core is made coextensive in length with the tube, said core may be provided at its ends, before it is inserted into the tube, with alined saw cuts or kerfs 112 (Fig. 21) which afford means for properly starting the shanks of the hanger arms as they are driven into place, and for accurately alining said arms with respect to each other. This greatly simplifies assembling the device. The hanger arms may in this manner be applied to a finished tube without in any way marring the finish of the tube, and when the core is coextensive in length with the tube, said tube may be made comparatively light, while maintaining sufficient strength of the carriage bar as a whole.

The rollers 42 are applied to the arms 41 in the same general manner as shown in our aforesaid prior patent, and the features of the construction need not be further herein described.

In practice the bolt or pin 72 will be released from the lower annular groove 69 of the lower member of the standard when the fixture is contained within the compartment, so that the base fitting 53 may drop slightly away from the lower end of the upper tubular member of the standard. Thus if a blow or shock be brought upon one end wall of the trunk its force will not be transmitted through the solid standard and extension rail structure to the other end, or to the hinged connections between the extension rail and fixed rail. If the telescoped structure were such as to afford a solid connection between the top and bottom end walls such end thrusts would tend to crush the end walls and to derange the hinge connections between the fixed and extension rails.

While we have described our invention with considerable particularity both with respect to its construction and application, it is to be understood that we do not limit the invention in its several phases to the specific construction and application shown except as hereinafter made the subject of specific claims.

We claim as our invention:—

1. A trunk or compartment having a rigid upper end and being open at the front, said upper end being higher along its longitudinal median line than at either side thereof, and a suspension device within said upper end and arranged beneath said longitudinal median line thereof.

2. A trunk or compartment having a rigid gabled upper end wall and open at the front, and a suspension device within said gabled end and arranged beneath the ridge of said wall and parallel thereto.

3. A trunk or compartment having a rigid gabled upper end wall and open at the front, and a suspension device within said gabled end and arranged beneath the ridge of said wall and parallel thereto and movable outward through the open front.

4. A trunk or compartment having a gabled upper end, a ridge piece beneath the meeting margins of the inclined members of the upper end wall and attached to said members, and a suspension device carried by said ridge piece.

5. A trunk or compartment having a gabled upper end and a suspension device within said gabled end and arranged beneath the ridge of said end and parallel thereto, embracing a detachable hanger the ends of which are arranged closely adjacent to the inclined members of the gabled end, for the purpose set forth.

6. In a suspension fixture device, the combination with a fixed rail and its support, of an extension rail provided at one end with a fitting having hinged engagement with said support, and a latch mounted on the upper side of said support and provided beyond the support with a socket, the extension rail fitting being provided with a lug arranged to automatically engage with said socket when the extension rail is swung to a horizontal position, the said support being provided on its upper surface with a lug over which the socket fits and having bearing with the latch in rear of the socket.

7. In a suspension fixture device, the combination with a stationary rail and its support, of a swinging extension rail provided with a fitting having hinged connection with said support, said fitting and support having lugs on their upper sides which are brought into abutting engagement when the extension rail is swung upwardly, and a pivoted spring pressed latch on the upper side of the support having a notch adapted to fit down over the abutting lugs of the support and fitting to lock the extension rail in its horizontal position.

8. In combination with a receiving compartment, of a suspension device fixture comprising a fixed horizontal rail therein, a tubular extension rail connected to the fixed rail and arranged to be folded into the compartment, a standard supporting the outer end of the extension rail and having telescopic connection therewith, and a latch carried by said standard arranged to engage a shoulder on the extension rail to lock the standard in its telescoped position.

9. In a suspension fixture device, a fixed horizontal rail, a tubular extension rail connected therewith and a standard hinged to and supporting the outer end of the extension rail and arranged to telescope thereinto, said standard comprising two members having telescopic engagement with each other, and a single manually operable locking device for locking the members of the standard telescoped and for locking the standard telescoped in the extension rail.

10. In a suspension fixture device, a stationary horizontal rail, a tubular extension rail connected thereto and a standard for supporting the extension rail arranged for telescopic engagement with the tubular extension rail, said standard comprising an upper tubular part and a lower part fitting with telescopic engagement therein, and a swinging latch lever mounted on the lower end of the tubular member of the standard and having locking devices arranged for locking the standard telescoped in the tubular extension rail, and for locking the lower end of the standard in telescopic relation to the upper tubular member thereof.

In testimony, that we claim the foregoing as our invention we affix our signatures in the presence of two witnesses, this 17th day of November A. D. 1908.

CHARLES T. WILT.
ELMER E. WILT.

Witnesses:
W. L. HALL,
GEORGE R. WILKINS.